US007321863B2

(12) United States Patent
Hartmann et al.

(10) Patent No.: US 7,321,863 B2
(45) Date of Patent: Jan. 22, 2008

(54) SYSTEMS, METHODS, AND COMPUTER PROGRAM PRODUCTS FOR STORING AND RETRIEVING PRODUCT AVAILABILITY INFORMATION FROM A STORAGE CACHE

(75) Inventors: Joshua Hartmann, New York, NY (US); DeWitt Clinton, New York, NY (US); Kishore Pallamreddy, Flower Mound, TX (US); Daniel Shtarkman, Dallas, TX (US)

(73) Assignee: Travelocity.com LP, Fort Worth, TX (US)

( * ) Notice: Subject to any disclaimer, the term of this patent is extended or adjusted under 35 U.S.C. 154(b) by 405 days.

(21) Appl. No.: 10/635,273

(22) Filed: Aug. 6, 2003

(65) Prior Publication Data
US 2005/0033621 A1    Feb. 10, 2005

(51) Int. Cl.
*G06F 17/60* (2006.01)
(52) U.S. Cl. .............................. 705/5; 711/118; 711/129
(58) Field of Classification Search ................. 705/5, 705/6; 711/129, 130; 707/5
See application file for complete search history.

(56) References Cited

U.S. PATENT DOCUMENTS

| 5,309,355 A | 5/1994 | Lockwood |
| 5,576,951 A | 11/1996 | Lockwood |
| 5,758,328 A | 5/1998 | Giovannoli |
| 5,901,287 A | 5/1999 | Bull et al. |
| 5,995,943 A | 11/1999 | Bull et al. |
| 6,657,955 B1 * | 12/2003 | Bonneau et al. ............. 370/229 |
| 6,742,033 B1 * | 5/2004 | Smith et al. ................. 709/224 |
| 2002/0065688 A1 * | 5/2002 | Charlton et al. ................ 705/5 |
| 2002/0138699 A1 * | 9/2002 | Okamura ..................... 711/133 |

(Continued)

FOREIGN PATENT DOCUMENTS

WO    WO 02/25557 A2 *    3/2002

(Continued)

OTHER PUBLICATIONS

Keller, Arthur, A predicate-based caching scheme for client-server database architectures, 1996, The VLDB Journal, pp. 35-47.*

(Continued)

*Primary Examiner*—John W. Hayes
*Assistant Examiner*—Shannon Sailiard
(74) *Attorney, Agent, or Firm*—Alston & Bird LLP

(57) ABSTRACT

The present invention provides methods for efficiently handling product availability queries. The present invention provides a local availability cache that is prepopulated with product availability listings from various product sources. Customer product availability queries are processed using the prepopulated availability cache, as opposed to independently querying each product source. The present invention also uses methods to manage the cache, such as by limiting the length of use data records stored for each start of use day to a maximum length of use and updating of data in the query using a function that updates data for start dates of use that occur sooner in time than for start dates of use that occur later in time. The present invention also uses functions to determine availability for length of use requests that exceed the maximum length of use stored in the cache by piecing together availability information for smaller lengths of use.

64 Claims, 6 Drawing Sheets

U.S. PATENT DOCUMENTS

| | | |
|---|---|---|
| 2002/0147657 A1 | 10/2002 | Callender et al. |
| 2002/0147888 A1* | 10/2002 | Trevathan .................. 711/133 |
| 2002/0154162 A1 | 10/2002 | Bhatia et al. |
| 2003/0014403 A1* | 1/2003 | Chandrasekar et al. ........ 707/5 |
| 2003/0061444 A1* | 3/2003 | Herbst et al. ............... 711/118 |
| 2003/0105744 A1* | 6/2003 | McKeeth ....................... 707/3 |
| 2003/0187851 A1* | 10/2003 | Fay et al. ..................... 707/10 |
| 2003/0204694 A1* | 10/2003 | Degenaro et al. ........... 711/164 |
| 2003/0233311 A1* | 12/2003 | Bramnick et al. ............ 705/37 |
| 2004/0078251 A1* | 4/2004 | DeMarcken .................. 705/5 |
| 2004/0098541 A1* | 5/2004 | Megiddo et al. ............ 711/129 |
| 2004/0249682 A1* | 12/2004 | DeMarcken et al. ........... 705/5 |
| 2004/0249683 A1* | 12/2004 | Demarcken et al. ........... 705/5 |
| 2004/0249684 A1* | 12/2004 | Karppinen .................... 705/5 |
| 2005/0004919 A1* | 1/2005 | Green et al. ................. 707/100 |

FOREIGN PATENT DOCUMENTS

WO    WO 03/040883 A2    5/2003

OTHER PUBLICATIONS

Business Technology Editors; Chicago Business Wire, Jul. 12, 2000; Order Trust Adds Proxy Inventory to Its Order Management Service Offerings.

International Search Report for PCT/US04/24584,, mailed Dec. 9, 2005.

* cited by examiner

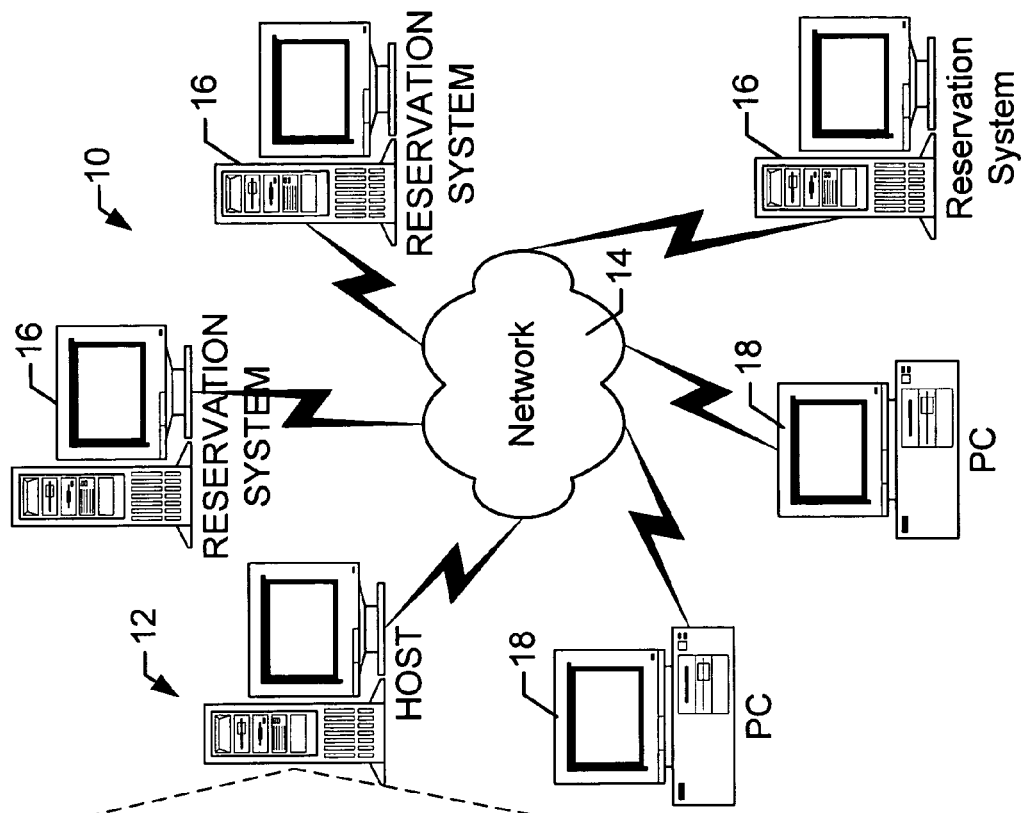
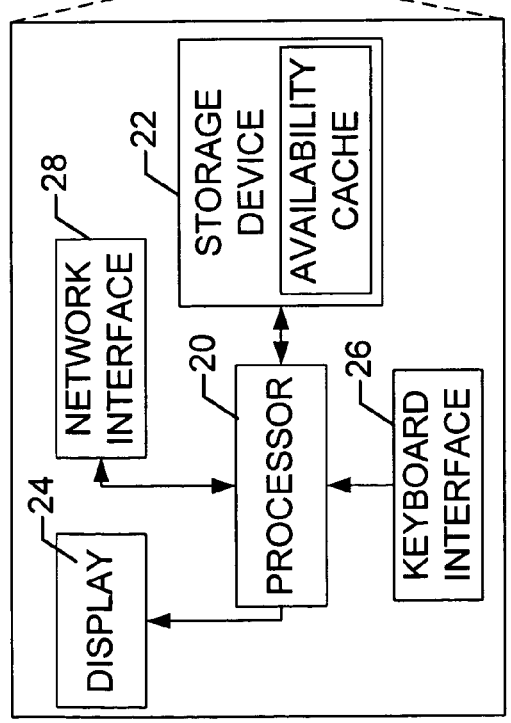

SYSTEMS, METHODS, AND COMPUTER PROGRAM PRODUCTS FOR STORING AND RETRIEVING PRODUCT AVAILABILITY INFORMATION FROM A STORAGE CACHE

BACKGROUND OF THE INVENTION

1. Field of the Invention

The present invention relates generally to providing product availability information to a user and more specifically to prepopulating a storage cache with product availability information, retrieving availability information from the cache and maintenance of the cache.

2. Description of Related Art

Several companies now provide discounted products to customers via web sites or via other electronic means. These companies contract with the product providers for discounted rates. The company then offers the products to its customers via a web site at a reduced price. The business relationships are beneficial to all, as they allow the product provider to experience increased sales without added marketing, and the customer receives the product at a reduced cost. A wide variety of products are sold in this manner.

For example, a wide range of commodity products, such as electronics, books, parts, etc., are sold on the Internet through discount web sites. These discount web sites contract with product providers to offer the products on their web sites at a discount. Typically, the web site will contain several listings for the same product from different product providers. When a customer selects a specific product, the discount web site sends a query to the source of the product to check availability and reports this to the customer. If the customer selects to purchase the product, the discount web site again checks availability and if the product is available, places an order for the product with the product source to be shipped to the customer.

There are also an increasing number of companies now offering other types of discounted products and services on the Internet, such as travel related services. These companies contract with hoteliers, airlines, car rental companies, etc to provide discount rates. These products are then offered to the customer in response to queries from the customer concerning specific travel needs at a lower price.

Unlike commodity type products, however, travel related products are typically much more complicated to administer in terms of availability determinations and pricing. Specifically, hoteliers and airlines place certain restrictions on their products that must be accounted for in determining availability. For example, hoteliers set requirements such as maximum and minimum lengths of stay and dates that are closed to check-in, where rooms are not available for check-in. Further, they may adjust room rates based on length of stay, check-in date, and the hotelier's predicted bookings. Advancements in automated revenue management techniques have allowed hoteliers to manipulate these requirements to respond to market conditions rapidly. For this reason, it is important that availability information is accurately determined, as well as product price.

FIG. 1 illustrates an example of a typical conventional network environment 10 in which a discount travel system is operated. The system typical includes a host computer 12 that operates a web site or other similar customer interface. The host computer is typically connected to a network 14, such as the Internet. Also connected to the network are various reservation systems 16 for different products sources, such as hoteliers, airlines, car rental companies, etc. Further, customers are also connected to the network via personal computers 18 or other types of computing systems.

In operation, the travel agency, via the host computer 12, provides a web page or other similar electronic form to the customer. Using the web page, the customer inputs a travel related query. Based on this query, the host computer, in turn, polls the reservation systems 16 of the product providers for availability information. The host computer assimilates the results of these queries and provides them in a web page or other electronic form to the customer.

An important issue with many of these conventional systems is processing delays associated with responding to customer queries. As noted above, because of the nature of many travel related products, it is important to provide up to date availability and pricing information. For this reason, conventional systems typically poll each product provider for availability information each time a customer request is submitted. Specifically, in response to an availability request concerning a given geographic area, date of arrival, and length of stay, many of these systems access the reservation system 16 of each product source, run the required availability queries, and provide the customer with a list of all available hotels meeting the criteria set forth in the query. For each hotel, there may be a price listing for different room classes, (e.g., double, king, room with a view, etc.), provided to the user, which requires the system to create a query for each hotel class. Some systems may provide the customer with upwards of 50 to a 100 different hotels meeting their query, with pricing information for each class of room offered by each hotel. As is apparent, the processing time required to poll the reservation system of each product provider and assemble this information may be excessive to the point that the time delay it is not acceptable to the customer. For example, if the system queries 50 hotels at an average of three queries apiece, and each query requires 10 to 15 seconds, the processing time may be in the range of 25 to 40 minutes for one customer request.

In light of these issues, systems, methods, and computer program products are needed that provide product availability information from various product sources to a customer in a more timely manner, while also ensuring that the availability and pricing information is accurate.

BRIEF SUMMARY OF THE INVENTION

The present invention provides systems, methods, and computer program products for efficiently handling product availability queries. Specifically, in one embodiment, the systems, methods, and computer program products of the present invention provide a local availability cache that is associated with an availability requestor. The systems, methods, and computer program products prepopulate the cache with product availability listings from various product sources. During operation, customer product availability queries are processed using the prepopulated availability cache, as opposed to independently querying each product source. By using the cache for availability inquiries, processing times are significantly reduced.

In addition to providing a prepopulated availability cache, the present invention also provides systems, methods, and computer program products for efficiently managing and querying the availability data stored in the cache. Specifically, as the availability cache is used by the present invention for product availability queries, the cache must include a large amount of data related to the product, and the availability and price information must be updated on a regular basis. For example, if the products are hotel rooms, the cache must include availability information for each hotel in the form of different room classes, for different check-in dates, and different lengths of stay. For 330 days of check-in availability, 26-night maximum length of stay, and five (5) different room types, the system would need to perform 51,480 queries every time to update the availability cache information for the hotel. If the system includes 5000 hotels, a quarter billion queries would be needed to update the availability cache completely. This number of required queries prohibits daily update of the cache.

In light of this problem, the systems, methods, and computer program products of the present invention provide a mechanism for efficiently updating the availability cache. The systems, methods, and computer program products of the present invention realize that product availability changes occur more frequently as the date of use of the product approaches. Specifically, in the hotel and airline industry, most product purchase activity occurs closer to the check-in or flight date and activity decreases the further out in time that the check-in or flight date occurs.

Using this observation, the systems, methods, and computer program products of the present invention employ a fall-off function that instructs the present invention to update availability information for check-in, flight dates, etc. that occur sooner more frequently than dates that occur farther out. Under this scheme, check-in, flight dates, etc. occurring in the next few weeks or months are updated more frequently than dates occurring in the more distant future. Through this procedure, the systems, methods, and computer program products of the present invention are able to provide an availability cache having acceptable percentages of updated information, without requiring the system, methods, and computer program products of the present invention to perform an excessive number of update queries on a daily basis.

In some embodiments, the fall-off function is further enhanced based on observations made regarding the practicality of the system. Specifically, the systems, methods, and computer program products of the present invention may collect data indicating the popularity of certain hotels, airline flight segments, rental car class, etc. This popularity information or scoring can then be used to influence the fall-off function, such that popular products receive more frequent updates than less popular products. Seasonal information may also be used to affect the fall-off function results. For example, hotels in New Orleans may be updated more often in the cache for dates covering Mardi Gras, regardless of how far off Mardi Gras is from today's date.

For practical reasons, the availability cache includes several data records for each class of room and each check-in date. Specifically, the availability cache does not include only one-night availability information for each check-in or start date. Instead, it includes data records for various lengths of stay for each class of hotel room and check-in date. This is because hoteliers and other types of product providers typically close certain dates to check-ins and place other restrictions on specific dates, meaning that customers are not allowed to check-in on these dates. Further, hoteliers may charge a higher nightly rate for a one-night length of stays than for a three or four night length of stay. If the availability cache only included one-night length of stay data that was strung together to meet the customer's length of stay request, a date closed to check-in occurring during the customer's length of stay would return that the hotel is not available when it actually is available for the longer length of stay requested by the customer. Further, the strung together single night stays may be more expensive than a four-night length of stay request. As such, for each check-in date or start date, the cache will include a query for each length of stay from the check-in date. For example, if the check-in date is May 1, the cache will typically include a query entry for May 1 with a length of stay of one night, an entry for May 1 with length of stay of two nights, a length of stay of three nights, and so on. As is apparent, this practice requires that a large amount of data be stored in the cache.

To remedy this issue, the systems, methods, and computer program products of the present invention initially limit the length of stay data for a given check-in or start date to a predetermined maximum length of stay number. Typically, the maximum length of stay is capped to 1-15 days, and more typically, 1-8 days. For example, in one embodiment, the maximum length of stay availability data stored for a given check-in or start date is four (4) nights. In other words, for each check-in or start date, the cache includes entries from 1 to 4 nights length of stay. By limiting the required entries in the cache to a maximum number of length of stays, the systems, methods, and computer program products of the present invention advantageously reduce the overall size of the cache. Further and importantly, this also reduces the number of queries that must be made to hoteliers reservation systems to update the availability information in the cache.

As discussed, the above embodiment of the present invention limits the length of stay availability information for each given check-in date stored in the cache. This restriction can cause problems when the customer requests availability for a length of stay that is greater than the maximum length of stay stored in the cache. For example, if the maximum length of stay stored in the cache is four (4) nights, but the customer request availability for a six (6) night length of stay, there will not be availability information in the cache for this query.

In light of this issue, the present invention provides systems, methods, and computer program products that employ a repiecing function to fulfill the availability request based on the stored data in the cache. In this embodiment, the systems, methods, and computer program products of the present invention separate the availability request into two or more availability queries that are each equal to or less than the maximum length of stay stored in the cache. The systems, methods, and computer program products determine availability for the these requests, and if the product is available based on these repieced requests, the systems, methods, and computer program products provide the availability information to the user.

The repiecing function may be based on any set of logical rules for separating the availability request into smaller length of stay requests. However, in one embodiment of the present invention, the systems and methods use a repiecing function defined by the following two parameters. First, the repiecing function does not parse the availability request into shorter length of stay queries having only one night length of stay. This is to avoid date closed to check-in restrictions by the product provider that may falsely return a non-availability answer to the request. Second, the repiecing function provides at least two separate sets of parsed availability requests scenarios, where the intermediary check-in dates for one of the scenarios have been shifted by at least one day from that of the other scenario. By creating two scenarios having different intermediary check-in dates, there is a better chance that one of the scenarios will not have check-in dates that fall on a date closed to check-ins. (The two scenarios will have the same initial check-in date, but the remaining parsed length of stays for each scenario will have different start dates.).

For example, if the availability request from the customer has a nine (9) night length of stay and the maximum length of stays stored in the cache is four (4) nights, the repiecing function may parse the request into two separate sets of availability requests scenarios each containing availability request for length of stays that total to the customer's desired length of stay (LOS) nine (9) nights, such as Scenario 1: (3 LOS, 4 LOS, 2 LOS) and Scenario 2. (2 LOS, 4 LOS, 3 LOS). For each set of parsed queries, the systems, methods, and computer program products of the present invention will establish check-in dates, check availability, and return an answer. If both sets of parsed queries provide availability, the systems and methods of the present invention will provide the availability and pricing information to the customer for the set that returned the lowest price.

Importantly, as illustrated from the two sets of parsed query scenarios, the check-in dates in the second scenario are shifted from that of the first scenario to hopefully provide at least one set of queries that does not include a check-in date that is closed to check-ins. In particular, the first scenario has check-in dates of day 1 for a three-night stay, day 4 for a four-night stay, and day 7 for a two-night stay. If check-in day 4 is a date closed to check-ins, the availability request constructed of these parsed lengths of stay will return a no availability response. However, the second set of parsed dates includes check-in dates of day 1, day 3, and day 6, which would avoid the closed to check-ins day 4 and provide an availability response.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 2A is a block diagram depicting a general network system in which the present invention may be implemented according to one embodiment.

FIG. 2B is a block diagram depicting a general computing system in which the present invention may be implemented according to one embodiment.

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

The various aspects of the present invention mentioned above, as well as many other aspects of the invention are described in greater detail below. The systems, methods, and computer program products of the present invention are described in a hotel reservation environment. It must be understood that this is only one example of the use of the present invention. Specifically, the present invention can be adapted to any number of products and services and is not limited to the hotel industry. For example, the present invention may be used with airline tickets, cruises, restaurants, car rentals, sports events, etc.

I. Availability Information Caching

Figure 1:
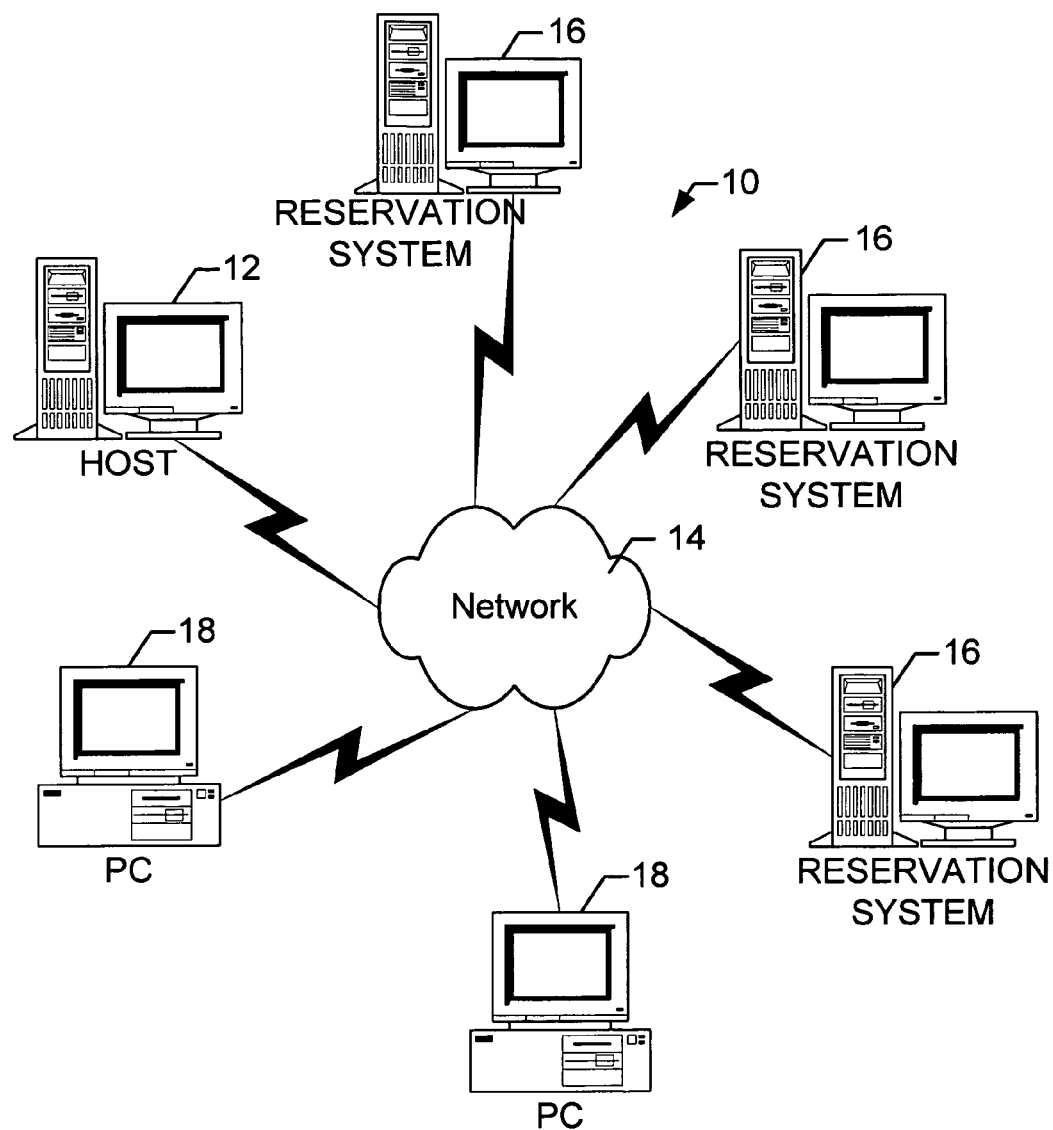
FIG. 1 is a block diagram depicting a general network system used with conventional web based systems.

FIG. 2A is an illustration of generalized network environment in which the systems, methods, and computer program products of the present invention may be implemented. Specifically, similar to the networked system illustrated in FIG. 1, the system includes a host computer 12 that operates a web site or other similar customer or user interface. The host computer is typically connected to a network 14, such as a LAN, WAN, Intranet, or Internet, for example. Also connected to the Internet are various computing systems 16 for different products sources, such as hoteliers, airlines, car rental companies, etc., and customer computing systems 18. While not shown, the host computer may also be directly connected to either or both computing systems 16 and 18, in embodiments in which a network is not used to access the host computer.

As illustrated in exploded FIG. 2B, the host computer system of the present invention is generally embodied as a typical computer, server or mainframe system depending on the embodiment. They system generally includes a processing element 20, such as a microprocessor, VLSI, ASIC, etc., a storage device 22, display 24, keyboard and mouse interface 26, and a network interface 28.

It is noted here that the term customer and user are both used herein. These terms are for the most part used interchangeably. User may sometime be used to refer to individuals or entities that maintain the system, as opposed to individuals or entities that purchase product. Further, the terms "check-in dates" and "length of stay" are used herein as specific to embodiments in which the product is hotel rooms. It is understood that other products with which the present invention is used may use the terms "start date of use" and "length of use."

As mentioned above, one important aspect of the present invention is use of a prepopulated cache from which availability information is derived for customer requests. Specifically, as shown in FIG. 2B, the host computer system of the present invention includes an availability cache 30 located in the storage device. The availability cache is populated with various product availability information needed to properly respond to availability requests issued by customers. FIG. 2B illustrates the cache 30 stored in the storage device located in the host computer. However, it must be understood that the cache could be stored in any storage device electrically connected to the host computer either internal or external. The cache could be stored in a remote storage device to which the host computer is connected via a network.

The various operations of the present invention may be performed either by hardware in the form of ASIC chips or other specialized hardware or by operation of software ran by a processing element. In the latter case, the storage device may also further include the various computer software programs and modules used to implement the operations of the present invention.

Figure 3:
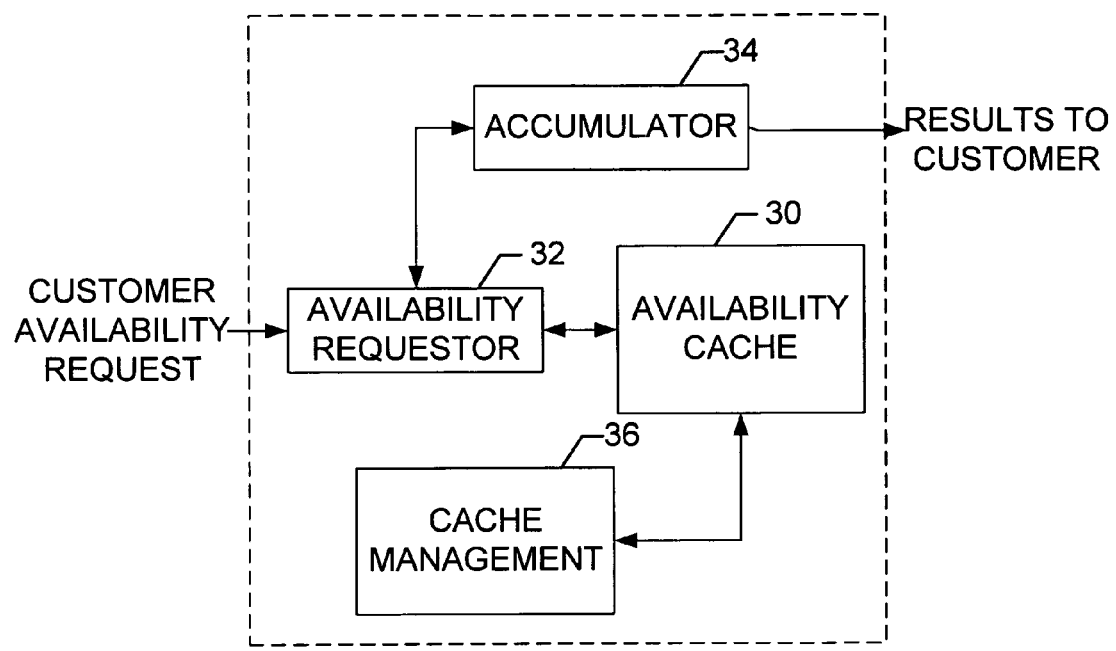
FIG. 3 is an operational block diagram illustrating the various functions of the systems, methods, and computer program products of the present invention according to one embodiment.

FIG. 3 is an operational block diagram of the system of present invention according to one embodiment, which can be implemented either as hardware, software, and/or a combination of both hardware and software. As illustrated, the system includes an availability requester 32 for receiving availability requests from a customer. The availability requester is connected the cache 30 for performing availability queries thereon. The system further includes an accumulator 34 connected to the availability requestor 32 that accumulates the various responses generated by the availability requester made to the cache. The accumulator amasses the response, inputs them into a web page or other electronic form, and outputs the results to the customer. The system also includes a cache management system 36. The cache management system is connected to the cache and manages initial population and updates to the data stored therein. The cache management system is connected to the hotelier's reservations systems via the Internet or other connection for constructing and running availability queries on the hotelier's reservation systems and storing the availability information in the cache 30. It is understood that the availability requestor, accumulator, and cache management system could all be performed by the processing element 20 using software or by use of specialized hardware.

As discussed, in a general embodiment, the systems, methods, and computer program products of the present invention provide a availability cache 30 that includes prepopulated availability data from the various hotelier reservation systems. The systems, methods, and computer program products of the present invention use this availability cache to fulfill availability requests by customers. In particular, the cache 30 is populated with all necessary data needed to fulfill an availability request. Where the product is hotel rooms, the cache of the present invention will include a plurality of data records for each hotel, for each class of room, and for each check-in date. Table 1 below is a generalized data record for a given hotel having two classes of rooms for a given check-in date of August 1. As illustrated, for each check-in date, availability is provided for each class of hotel room and for different lengths of stay.

TABLE 1

| Hotel Name | Class of Room | Check-in Date | Length of Stay | Availability | Price |
|---|---|---|---|---|---|
| Hotel A | King | Aug. 01, 2003 | 1 | August 01 | 99.95 |
| | | | 2 | August 01, August 02 | 200.00 |
| | | | 3 | August 01, August 02, August 03 | 280.00 |
| | | | 4 | August 01, August 02, August 03, August 04 | 280.00 |
| | Double | | 1 | August 01 | 99.95 |
| | | | 2 | August 01, August 02 | 200.00 |
| | | | 3 | August 01, August 02, August 03 | 280.00 |
| | | | 4 | August 01, August 02, August 03, August 04 | 280.00 |

With reference to FIGS. 2 and 3, to populate the availability cache 30, the cache management system 36 of the present invention creates a query list that is used to query each hotel for availability. Each query in the list includes a specific hotel identification, a hotel room class, check-in date, length of stay, and request for pricing. During off-peak hours, the cache management system 36 uses the generated query list to make availability requests to each of the hoteliers computing systems 16. Availability responses are received from the hotelier and stored in the cache in a similar manner as shown in Table 1.

After the cache has been sufficiently populated, it is then used by the availability requestor 32 to fulfill availability requests by customers. Specifically, as illustrated in FIGS. 2 and 3, customers can access the host computing system 12 through either an Internet connection 14 or by some other electronic connection. The customer inputs an availability request typically in the form of a geographic area, date of arrival, and length of stay. This information is received by and operated on by the availability requestor 32. Specifically, the availability requestor 32 polls the cache 30 based on the content of the customer's query. The availability requestor determines all hotels in the selected geographic region having availability for the check-in date and length of stay requested. The accumulator 34 accumulates these responses into a web page or other electronic form. Typically, the accumulator only stores availability responses with non-availability responses being discarded. The results are then transmitted to the customer for display.

After reviewing the results, the customer may wish to select a hotel and make a reservation. In this instance, the systems, methods, and computer program products of the present invention do not use the cache 30 for availability checking during actual purchase. Instead, the systems, methods, and computer program products query the actual reservation system 16 of the hotelier and determine whether the selected hotel has availability for the check-in and length of stay selected by the customer. If there is availability, the systems and methods of the present invention make the reservation for the customer and properly notify the customer. If for some reason there is a discrepancy between the cache 30 and the actual availability of the hotel, such that the requested reservation is not available, the systems, methods and computer program products of the present invention return a non-availability response to the customer.

As illustrated in the above example, the availability cache of the present invention is used to more efficiently process availability requests from customers. By using the cache, the present invention is not required to contact each hotelier's reservation system each time a new availability request is received from a customer. As such, the systems, methods, and computer program products of the present invention can significantly reduce time required to process availability requests.

As suggested above, the availability cache is typically only used to check availability when a customer is browsing and not to check availability when the customer has selected to make a reservation. In this instance, it is typically advantageous to actually contact the reservation system of the hotelier to check availability and make the reservation. The availability cache is typically used in the customer browsing mode when the system is required to provide a plurality of availability of information concerning different hotels in a rapid manner.

II. Length of Stay and Check-in Date Capping

In the general embodiment discussed above, it is advantageous to populate the availability cache 30 with all length of stay possibilities for each check-in date for each room class for each hotel. However, as understood, such a system requires and enormous amount of data storage and maintenance. For example, to store information for one hotel having five (5) classes of rooms for 365 length of stay records would require 1825 records for one check-in date. If the reservation system includes information for 4000 hotels, this would be 7.3 million records for one given check-in date for all of the hotels in the system. For 365 check-in dates, the number of records would be in the area of 2.7 billion records.

In light of these significant data storage issues, the present invention provides various systems, methods, and computer program products for maintenance of the availability cache. The present invention reduces the number of data records that must be stored to satisfy availability requests. Further, it provides methods for updating the cache that reduce the number of updates that must be made on a daily basis. For example, in one embodiment of the present invention, the number of data records for a given hotel, hotel class, and check-in date are capped to thereby reduce the number of data records stored in the cache.

In this regard, it has been recognized that over 90% of customers request hotel stays of less than four nights in duration. Further, it has been recognized that many of the restrictions placed on hotel rooms by hoteliers generally only apply to one or two night stays. In light of this, in some of embodiments, the systems, methods, and computer program products of the present invention cap the number of data records stored in the cache based on length of stay. Typically, the maximum length of stay is capped to 1-15 days, and more typically, 1-8 days. As an example, in one embodiment, the data records are capped to four (4) nights length of stay. Using a maximum length of stay cap significantly reduces the number of required stored data records.

Taking the above example, if the maximum length of stay is capped to four (4) nights, for one hotel having five (5) classes of rooms for four (4) length of stay records would require 20 records for one check-in date. If the system includes information for 4000 hotels, this would be 80,000 records for one given check-in date for all of the hotels in the system and 29.2 million for 365 check-in dates, which is significantly less that the 2.7 billion records quoted in the above example.

As illustrated, using a maximum length of stay cap significantly decreases the number of stored data records. However, 29.2 million records may still be considered a large number of data records to maintain in the availability cache. In light of this, in some embodiments, the systems, methods, and computer program products of the present invention may further limit the number of records stored in the availability cache by limiting the number of check-in dates stored in the cache. For example, if the maximum number of check-in dates was reduced from 365 days to 260 days, the number of data records could be reduced from 29.2 million to 20.8 million.

In addition to limiting the number of data records to a maximum length of stay for each hotel class and check-in date, the systems, methods, and computer program products of the present invention may also provide methodologies of extrapolating shorter length of stay requests from the maximum length of stay data stored in the cache. It is typically not possible to directly extrapolate smaller length of stay availability from the maximum length of stay information for the following reasons: the rates may be different; some dates may be closed to arrival; and minimum length of stay restrictions. However, analyzing existing cached availability data may allow the system to determine when it is appropriate to extrapolate from larger length of stay queries.

In this embodiment, on the first reading day for a particular check-in date the system will get retrieve availability information for the maximum length of stay and all the check-in and length of stay combinations that can be derived. The smaller length of stays whose rates match that of the maximum length of stay data are marked derivable. The systems, methods, and computer program products then only retrieve availability information for the maximum length of stay record for updating the cache on subsequent readings and derive availability for smaller lengths of stays (that are marked derivable) from the data for the maximum length of stay. If on the first reading day the maximum length of stay query returns availability, but the smaller lengths of stays do not (because of closed to arrival or minimum stay restrictions), the system will assume there is no availability on subsequent reading days.

For example, during a first reading, the systems, methods, and computer program products will access the hotelier's reservation system and determine availability for different lengths of stay up to a maximum length of stay for a given hotel, hotel class, and check-in date. The present invention will compare the results of the shorter length of stay data to that of the maximum length of stay data. If the shorter length of stay data indicates availability and the price for the rooms is the same as that of the maximum length of stay data, the shorter length of stay is marked as derivable and a data record is not created for the shorter length of stay. Instead, when availability is requested by the customer for the derivable shorter length stay, the systems, methods, and computer program products derive the availability information from the data record for the maximum length stay.

III. Maintenance of Cache Updates

Although the use of maximum length of stay and check-in date caps reduce the overall number of data records stored in the cache. There are still a large number of data records in the cache, such that it is either not feasible or not possible to update each of the data records on a daily basis. Specifically, each query made to the computing system of a hotelier may require 10 to 15 seconds of processing time. This delayed processing time significantly limits the number of queries that can be made on a daily basis to refresh the cache. Coupled with this is the need to perform most queries of hotelier computing systems in the off-peak hours of the hotelier, so as to not significantly decrease the operation speed of the hotelier's reservation system. Further, there may be some hoteliers who actively limit the number of queries that can be made to their reservation system in a 24-hour period.

In light of these limitations and concerns, the present invention provides systems, methods, and computer program products that more efficiently manage updates and maintenance of the cache. In analyzing how hotel rates and availability change over time, it has been determined that hotel rate and availability is significantly more volatile among booking dates that are closer to the current date than bookings that are months away. For example, if today is January 1, hotel rates and availability information is changing more frequently for the period of January 1-15 than it is for the period of August 16-30. From this, it can be concluded that it not particularly necessary to query distant check-in dates as frequently as check-in dates occurring in the near future.

In view of this realization, the systems, methods, and computer program products of the present invention may employ a tunable fall-off function that informs the present invention as to what queries should be performed in order to maintain the cache at an acceptable level of accuracy, when only a limited number of queries is possible on a daily basis.

Figure 4:
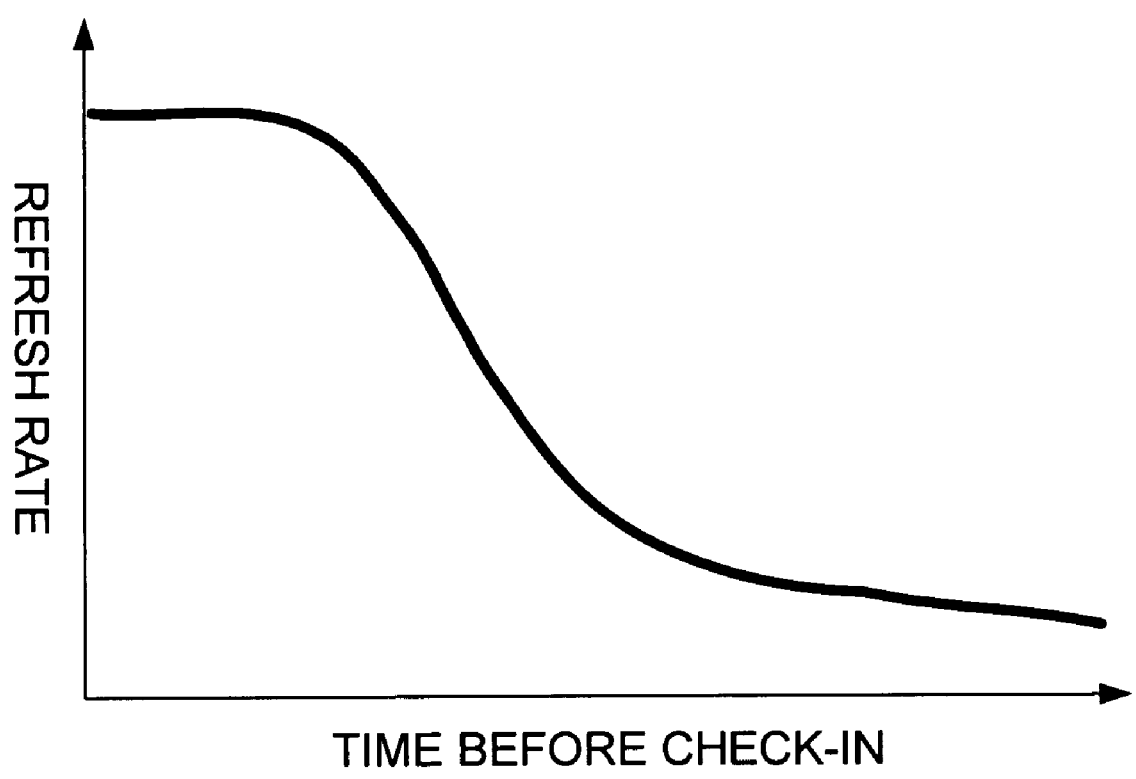
FIG. 4 is a graphical illustration of the changes in availability and pricing of a typical hotel over time.

It is understood that any particular function could be derived to fit the trend noted above. In one embodiment, the systems, methods, and computer program products of the present invention use a tunable fall-off function such as illustrated in FIG. 4. The chosen fall-off function is defined as:

Check-in Date=$N^{(\log\ day/\log\ length)}$ where

Check-in Date=date to be queried

N=integer number (0, 1, 2, 3, . . . Day)

Day=maximum number of days out to be queried (e.g., 260, 365, etc.)

Length=maximum number of days that can be returned in the query list.

This function represents the curve illustrated in FIG. 4.

By using the fall-off function, the systems, methods, and computer program products of the present invention generate a series of numbers that represent check-in dates from today's date that should be queried and updated in the cache. The list of numbers starts at 0 and grows exponentially to a maximum number representing a maximum check-in date to be queried. The distribution of the numbers in the list created by the fall-off function is roughly an exponential decay, such that there is a smaller frequency between dates at the beginning of the list than there is toward the end of the list. These numbers are then used to determine check-in dates to be queried. The check-in dates are then queried at the hoteliers' reservations systems for availability information and updated in the cache 30. The fall-off function, in practice, allows for queries of immediately proceeding check-in dates as much as daily, while medium range, (e.g., two-three months), to be queried every 3-5 days, and more distant check-in dates to be queried weekly or monthly.

In general, the systems, methods, and computer program products of the present invention use the fall-off function to create a query list that can then be later used to query hotelier computing systems for availability information and update the cache. The query list contains a series of individual rows, each representing a different query to be made to a particular hotel, for a given room class, check-in date, and length of stay. The queue is updated nightly based on the fall-off function.

The fall-off function uses the following parameters to generate the exponential list of check-in dates:

1) total number of hotel properties to be queried
2) total number of days that the availability cache should cover,
3) maximum length of stay for each check-in date to be cached,
4) average number of queries that will be performed per row, (i.e. Hotel Rate Detail (HRD)/Hotel Detail (HOD), and
5) maximum number of queries that can be performed in one day.

Figure 5:
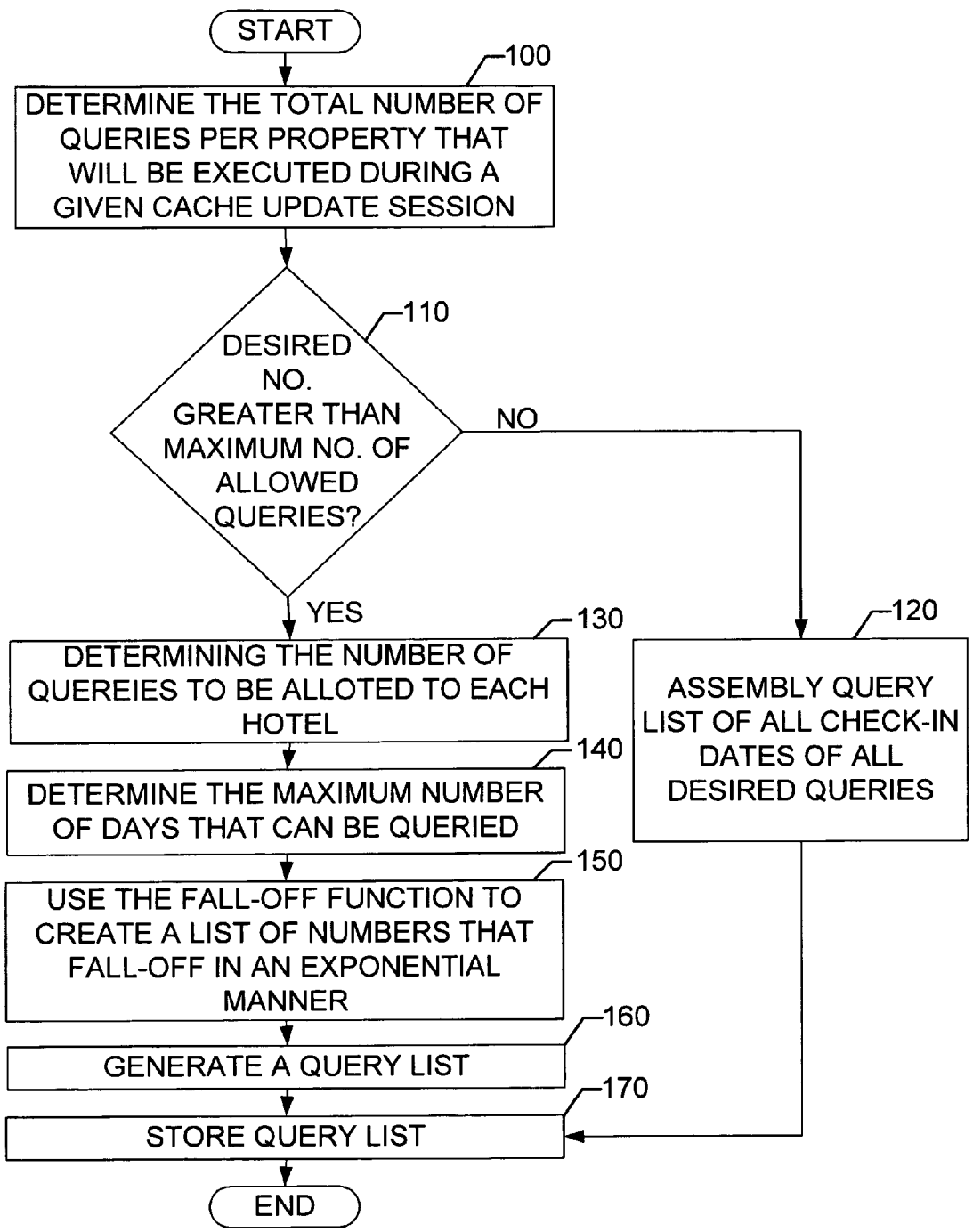
FIG. 5 is a block diagram illustrating the operation of the present invention to generate a query list for updating the availability cache according to one embodiment of the present invention.

FIG. 5 is a block diagram illustrating the operations performed to generate the query list used for updating the availability cache. Initially, the systems, methods, and computer program products determine the total number of queries per property that will be executed during a given cache update session. (See block 100). This number is based on:

1) total number of properties to be queried,
2) total number of days covered by the database,
3) maximum length of stay, and
4) average number of queries that will be performed for each data record, (i.e., HRD/HOD).

The last parameter relates to the amount of detail that is required for each data record. Specifically, a Hotel Detail (HOD) query only returns the property identification, check-in date, and a hotel room rate but does not include taxes and possible rate changes. The HOD level of detail is typically sufficient for most purposes. However, in some instances, greater detail is required. In this instance, the Hotel Rate Detail (HRD) provides more detailed tax and rate change information. An HRD is an added request that must be accounted for when determining the overall number of desired requests. This is typically accounted for in the query calculation by taking the ration of HRD/HOD. This number is sometimes estimated to be 1.5.

With reference to block 100, the total number of desired requests is calculated by multiplying the total number of properties to be queried, total number of days covered by the database, maximum length of stay, and the average number of queries, (i.e., HRD/HOD), that will be performed for each data record together. For example, if the parameters have the following values, the total number of desired queries would be 1) number of properties to be queried=500
2) number of days covered in cache=260
3) maximum length of stay=4
4) HRD/HOD=1.5 then number of desired queries=500*260*4*1.5=780,000

With reference to FIG. 5, after the total number of queries has been calculated, this number is then compared to the maximum number of queries that can be performed in one day. See block 110. (Note here that the term "in one day" does not necessarily mean 24 hours, but instead typically refers to the time allotted each day for performing updates of the cache, such as overnight, when there is less traffic on hotelier's reservation system.). If the number of queries desired to be updated is less the maximum number of queries, the method jumps to block 120 where a query list is generated that includes queries for all check-in dates. However, if the desired number of queries exceeds the maximum number of queries per day, the system jumps to block 130 to determine what check-in days should be queried. For example, if the maximum number of queries allowed per day is 200,000, but the desired number is 780,000, the system will jump to block 130. At block 130, the system divides the number of hotels by the maximum number of queries, (i.e., 200000/500=400), to determine the number of queries that will be allotted to each hotel property.

The system next determines the individual check-in dates to use for the query based on the fall-off function. As stated above, the fall-off function of one embodiment of the present invention is defined as follows:

Check-in Date=$N^{(\log\ day/\log\ length)}$ where

Check-in Date=date to be queried

N=integer number (0, 1, 2, 3, . . . Day)

Day=maximum number of days out to be queried (e.g., 260, 365, etc.)

Length=maximum number of days that can be returned in the query list.

Prior to calculating the check-in dates, the systems, methods, and computer program products of the present invention must determine the Length parameter. (See block 140).

The maximum number of days that can be returned in the query list, (i.e., Length is determined using the following equations:

$$\text{Length}=\text{int}(\text{queries}/(\text{maximumLengthOfStay}*\text{propertyCount}*\text{ratio}))$$

however, if Length>Days, then set Length=Days

In the present example, the Length would be:

$$\text{Length}=\text{int}(200{,}000/(4*500*1.5)=66$$

As will be understood, the Length represents the number of check-in dates that are going be queried for each property. These days will be logarithmically spaced apart across the spectrum of 0 to Days. The fall-off function will tell the system how these dates should be spread out. In the present example, Length is 66, which is less than the number of check-in dates stored in the cache (i.e., 260), which means for every given property we are going to look at 66 check-in dates and these dates are logarithmically spaced across the spectrum from 0 to 260, and the fall-off function defines the spacing of these dates.

After the Length parameter is determined, see block 140, the systems, methods, and computer program products of the present invention next use the fall-off function generate a series of numbers that fall-off exponentially. (See block 150). In the above example, the following string of numbers would be returned from the fall-off function (0, 1, 2, 4, 6, 8, 10, . . . , 91, 95, 99, . . . 249, 254, 260).

For example:
Check-in Date=$N^{(\log\ day/\log\ length)}$
Check-in Date=$N^{(\log\ 260/\log\ 66)}$
Check-in Date=$0^{(\log\ 260/\log\ 66)}$=0
Check-in Date=$1^{(\log\ 260/\log\ 66)}$=1
Check-in Date=$2^{(\log\ 260/\log\ 66)}$=2
Check-in Date=$3^{(\log\ 260/\log\ 66)}$=4
Check-in Date=$4^{(\log\ 260/\log\ 66)}$=6
: :
: :
: :
Check-in Date=$30^{(\log\ 260/\log\ 66)}$=91
Check-in Date=$31^{(\log\ 260/\log\ 66)}$=95
Check-in Date=$32^{(\log\ 260/\log\ 66)}$=99
: :
: :
: :
Check-in Date=$64^{(\log\ 260/\log\ 66)}$=249
Check-in Date=$65^{(\log\ 260/\log\ 66)}$=254
Check-in Date=$66^{(\log\ 260/\log\ 66)}$=260

Following generation of the exponential decaying number string, the systems, methods, and computer program products of the present invention next assimilate the query list. See block 160. Specifically, beginning with today's date, the systems, methods, and computer program products create a set of query records. The systems, methods, and computer program products then increment to the next date to be queried based on the number list generated by the fall-off function and again generate query records for this check-in date. This process is continued for all numbers in the list.

For example, if today is August 1 and the maximum length of stay is four (4) nights and the hotel has two classes of rooms, the systems, methods, and computer program products of the present invention would create the following data records for the first four listed check-in dates to be used to query the hotel for availability. Specifically, for August 1, the systems, methods, and computer program products of the present invention access the number list created by the fall-off function and add the first number in the list, (i.e., 0) to the date. The systems, methods, and computer program products next create a query listing for each length of day and hotel class. This process is continued for each successive number in the list. For example, for the third check-in date, the list includes the number three (3). The systems, methods, and computer program products add the number in the list to August 1, and returns August 4. The systems, methods, and computer program products, next create query listings for each length of day and hotel class for an August 4 check-in date.

TABLE 2

| Hotel Name | Class of Room | Check-in Date | Length of Stay |
|---|---|---|---|
| Hotel A | King | Aug. 1, 2003 | 1 |
| | | | 2 |
| | | | 3 |
| | | | 4 |
| | Double | | 1 |
| | | | 2 |
| | | | 3 |
| | | | 4 |
| | King | Aug. 2, 2003 | 1 |
| | | | 2 |
| | | | 3 |
| | | | 4 |
| | Double | | 1 |
| | | | 2 |
| | | | 3 |
| | | | 4 |
| | King | Aug. 4, 2003 | 1 |
| | | | 2 |
| | | | 3 |
| | | | 4 |
| | Double | | 1 |
| | | | 2 |
| | | | 3 |
| | | | 4 |
| | King | Aug. 7, 2003 | 1 |
| | | | 2 |
| | | | 3 |
| | | | 4 |
| | Double | | 1 |
| | | | 2 |
| | | | 3 |
| | | | 4 |

After the query list has been generated, it is stored in memory. See block 170. The systems, methods, and computer program products of the present invention can then access the query list in order to perform availability queries for each hotel listed and update the cache appropriately.

The above discussion describes a general embodiment of the fall-off function as implemented by the present invention. As illustrated, in generic form, the fall-off function treats all hotels in the query the same. It does not take into account the popularity of a particular hotel or seasonal considerations concerning certain hotels. These may, however, affect the accuracy of the information stored in the availability cache. For example, a hotel that is more popular than other hotels will probably experience more frequent changes in its availability data. Further, most hotels experience seasonal peak periods where availability is more volatile. This raises added concerns for the fall-off function. As mentioned, the fall-off function is designed to update closer in time check-in dates more frequently than more distant check-in dates. Seasonal periods, however, may experience increased availability changes at a much earlier date than other normal times of the year, which should be accounted for in the cache.

For these reasons, in some embodiments, the systems, methods, and computer program products of the present invention use intelligent query management techniques to enhance the fall-off function. One technique used to enhance the fall-off function is popularity scoring. The scoring system of this embodiment is based on the number of hits/views/looks that a property receives from a customer. In this embodiment, the system maintains a property activity list for each property, which lists collection dates and activities occurring on those dates, such as whether the customer viewed the listing, booked the listing, or cancelled the listing. The systems, methods, and computer program products use the property activity list to determine a score for the property based on the number of hits/views/looks stored in the activity list for a selected number of past days.

The scoring for each property may also be configurable. Specifically, an administrator of the system can increase or lower the score for a particular hotel based on their knowledge of the hotel. For example, even if the hotel has scored high for the past few days, it may have just ended its busy season. In this case, the administrator may wish to decrease its score. Oppositely, a hotel may currently have a low score, but may be entering its busy season, so that the administrator may wish to increase its score.

The scoring for each hotel property is used to adjust the number of queries allocated to the property for daily availability updates in the fall-off function. In particular, as discussed above, in the general application of the fall-off function, each hotel is allocated the same number of queries. By using scoring, however, the number of queries allocated to each hotel is altered such that hotels with higher scores receive more allocated queries and those with lower scores receive less allocated queries.

There may be exceptions to the scoring for some hotels. For example, a new hotel added to the cache will not have a scoring history. In this regard, the systems, methods, and computer program products may assign a high score to the hotel so as to more quickly populate availability information for the hotel. Further, hotels with low scores are typically maintained at equal to or above a lower query threshold to ensure that at least a minimum number of queries are assigned to the hotel for availability updates.

The systems, methods, and computer program products may also use an error rating system to influence the number of update queries assigned to each product source for updates of the cache. In this embodiment, the systems, methods, and computer program products determine a cache hit ratio for each product source. The cache hit ratio is the ratio of the total number of looks that return successful availability information versus the total number of looks of the product source. In other words, the systems, methods, and computer program products of this embodiment maintain a running total of the number of times a product source was returned in a customer availability query and the number of times that the product from the product source was determined to be available. These two values define the cache hit ratio for the product source. As this ratio decreases, it indicates that the availability requests for the product source is providing more and more non-availability responses, which may be a sign that the stored cache data is either out of date or deficient for some request dates.

For example, if a hotel is located in New York, is implicated in 300 customer availability queries for New York hotels, and only returns availability for 290 of the queries, then the hotel has a cache hit ratio of 280/300 or 93%. If another hotel in New York returns availability for 230 of the queries, then it has a cache hit ratio of 80%.

The systems, methods, and computer program products use the cache hit ratio for each product source to determine the number of availability queries to assign to each product source for cache availability updates. For example, in a general embodiment, the systems, methods, and computer program products may define a minimum cache hit ratio threshold. Each cache hit ratio for each product source is compared to the threshold. For those product sources having cache hit ratios below the threshold, the number of availability queries allotted to them for updating the cache is increased, while product sources having cache hit ratios in excess of the threshold are decreased so as to reallocate the total number of availability queries to be performed in an update session of the cache.

In a more complex application, the systems, methods, and computer program products may provide several different minimum thresholds based on popularity scoring of the hotels. For example, a first high threshold may be used for hotels having a higher popularity score and a second threshold for hotels having a lower popularity score to thereby ensure that hotels with high popularity scores still receive increased updates over lower scoring hotels.

IV. Repiecing of Shorter Length of Stay Data to Respond to a Longer Length of Stay Availability Requests As discussed above, to reduce the number of availability entries stored in the cache, the systems, methods, and computer program products of the present invention may limit availability information to a maximum length of stay. For example, the cache may only include one, two, three, and four night length of stay availability records for each class of hotel for each check-in date. While the cache includes adequate information for availability queries having length of stay of four nights or less, the cache does not provide availability information for availability queries having greater lengths of stay.

To address this issue, the present invention provides systems, methods, and computer program products that implement a repiecing function to effectively piece together shorter length of stay availability information to form an availability response to an availability request having a longer length of stay.

As understood, the repiecing function may assume many different forms. For example, in a simplest form, the repiecing function could merely take a maximum length of stay data record and add the necessary length of stay data record thereto to meet the request. If the request was for a five-night length of stay, the repiecing function could return a four-night length of stay and a one-night length of stay to meet the request. In other embodiments, the repiecing function could use shorter length of stay data records such as a two-night length of stay and a three-night length of stay combined to meet the five-night length of stay availability request.

While either of these versions of the repiecing function would provide an acceptable availability response for most requests, there are instances where these versions of the repiecing function may either provide a false non-availability indication or may return a higher price for the reservation than would be otherwise offered for a five night length of stay. Specifically, as discussed previously, hoteliers may close dates to check-ins for certain check-in dates and/or may charge higher rates for one-night lengths of stay. In this regard, under the first version of the repiecing function, the customer may be quoted a higher rate for the one-night length of stay request making up their five-night length of stay request or the one-night length of stay may fall on a date closed to check-ins, thereby causing the customer to receive an erroneous non-availability response to their request. In a similar manner, one of the check-in dates chosen by the second version of the repiecing function may also fall on a date closed to check-ins.

In light of these potential pitfalls, in one embodiment, the systems, methods, and computer program products of the present invention use a repiecing function that avoids one-night length of stays and reduces the chances of receiving a false non-availability response due to selection of a check-in date corresponding to a date closed to check-ins. Specifically, in one embodiment, a repiecing function is used that implements the repiecing by using only length of stay availability of two or more days. Further, the repiecing function provides two separate sets of availability request scenarios. The two scenarios are configured such that they do not contain the same check-in dates, (other than the same first check-in date), in attempt to avoid potential dates that are closed to check-ins.

Figure 6:
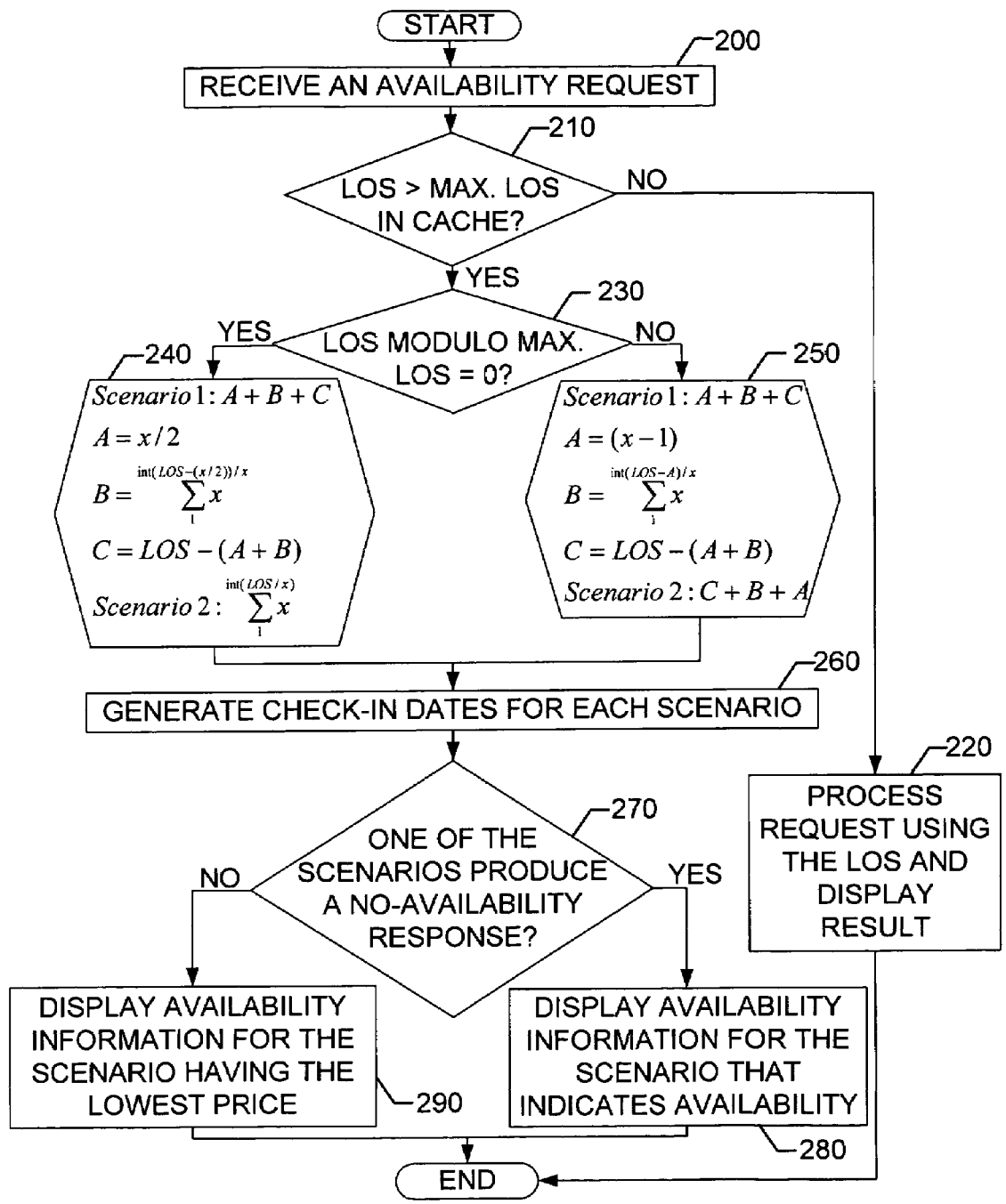
FIG. 6 is a block diagram illustrating the operation of the present invention to determine availability for a request having a length of stay exceeding the maximum length of stay stored in the availability cache according to one embodiment of the present invention.

Provided below is one example of a repiecing function meeting the above-mentioned parameters. The repiecing function provides different functions based on whether the length of stay requested by the customer is a multiple of the maximum length of stay stored in the cache. The operations of the repiecing function are discussed with regard to FIG. 6.

Initially, the systems, methods, and computer program products of the present invention receive an availability request from a customer. See block 200. The length of stay (LOS) associated with the request is compared with the maximum length of stay. See block 210. If the length of stay of the request is less than or equal to the maximum length of stay, then the request is processed using the proper length of stay data from the cache. See block 220.

However, if the length of stay of the request is greater than the maximum length of stay, the length of stay associated with the request is first processed to determine whether it is a multiple of the maximum length of stay. See block 230. Specifically, the systems, methods, and computer program products calculate the modulo of the length of stay of the availability request with the maximum length of stay stored in the cache:

LOS modulo X
where
LOS=length of stay of request
X=maximum length of stay stored in the cache If the LOS modulo X calculation is equal to 0, a first set of calculations are used to determine the two sets of parsed availability request scenarios, see block 240, and if the LOS modulo X calculation is other than 0, a second set of calculations are used to determine the two sets of parsed availability request scenarios, as is illustrated below. See block 250

If LOS modulo X=0
Then

Scenario 1: A, B, C $A = x/2$

-continued $$B = \sum_{1}^{int(LOS-(x/2))/x} x$$

$C = LOS - (A + B)$

Scenario 2:

$$= \sum_{1}^{int(LOS/x)} x$$

If LOS modulo X>0
Then

Scenario 1: A, B, C $A = (x - 1)$ $$B = \sum_{1}^{int(LOS-A)/x} x$$

$C = LOS - (A + B)$

Scenario 2: C, B, A

Each scenario produces a set of check-in days and length of stays. The systems, methods, and computer program products of the present invention, determine an availability response from the cache for each set of repieced queries. See block 260. If both scenarios return a non-availability response, the system does not include the hotel in the list of hotels having availability. If only one of the scenarios returns availability, see block 270, then the contents of this availability request is displayed to the user. See block 280. Further, if both scenarios return an availability response, the system displays the response having the lower price. See block 290.

As an example, if the length of stay of a request is for nine (9) nights and the maximum length of stay stored in the cache is four (4), following calculations will be performed.

LOS modulo X=9 modulo 4>0,
Then

Scenario 1: $A + B + C$

Where $A = (x - 1)$, $B = \sum_{1}^{int(LOS-A)/x} x$  $C = LOS - (A + B)$ $A = 4 - 1 = 3$,  $B = \sum_{1}^{int(9-3)/4} 4$  $C = LOS - (A + B)$ $A = 4 - 1 = 3$,  $B = \sum_{1}^{1} 4$  $C = 9 - (3 + 4) = 2$ therefore $(A, B, C,) = (3, 4, 2)$ Scenario 2: Reverse the above order if there is no avail for the above order.

(C, B, A)=(2, 4, 3)

As can be seen from this example, the repiecing function provides two different scenarios of different check-in dates and length of stays for querying the cache to produce and availability response.

As another example, if the length of stay of the request is eight (8) days, then the scenarios would be:

LOS modulo X=8 modulo 4=0,

Then

Scenario 1: $A + B + C$

Where $A = (X/2)$, $B = \sum_{1}^{int(LOS-X/2)/X} x$   $C = LOS - (A + B)$ $A = 4/2 = 2$,   $B = \sum_{1}^{int(8-2)/4} 4$   $C = LOS - (A + B)$ $A = 4/2 = 2$,   $B = \sum_{1}^{1} 4$   $C = 8 - (2 + 4) = 2$ therefore $(A, B, C,) = (2, 4, 2)$ Scenario 2: $\sum_{1}^{int(LOS/X)} X = \sum_{1}^{2} 4 = (4, 4)$ As yet another example, if the requested length of stay is 10, the repiecing algorithm would produce the following results:

LOS modulo X=10 modulo 4>0

Scenario 1: (3, 4, 3)

Scenario 2: (3, 4, 3)

As illustrated in this example, there are instance whether both scenarios produce the same check-in dates and length of stays, such that there is not two unique scenarios provided. In these instances, the systems, methods, and computer program products may alter one of the scenarios by, for example, subtracting a day from one of the parsed sets to produce an output of (2, 4, 4) or (4, 4, 2).

As discussed above, the systems, methods, and computer program products of the present invention are not limited to use with only hotel reservations, but instead may be used for any number of products and services. For example, the systems, methods, and computer program products may be applied to car rental reservations. In this instance, the cache would store availability information for each car rental company. The cache would include for each class of car, (e.g., compact, mid-level, luxury, sporty, etc.), a series of check-in or start dates. For each start date, the cache would include availability information for different lengths of use. As car rentals typically have more volatility in availability changes for start dates that closer in time than for start dates further out, the same or a similar fall-off function may be used to manage the cache, as well as scoring and cache availability update procedures. Further, a maximum length of stay may be imposed on the cache, which would require use of the repiecing function to respond to availability requests for long lengths of stay requests.

Cruise ship reservations is another example. Cruise ship include different class cabins and have different start dates for cruises. Different cruises may also have different lengths of days. Further, some cruises may take on passengers at different ports, such that some guests have different start dates and lengths of use. In these instances, the same parameters may be used in the cache as with hotel reservations, however some of the parameters may be used differently. For example, in a cruise having a fixed duration for all passengers, there would only be one length of use stored for the check-in start date.

Sporting or other entertainment event reservations could also be managed using the present invention. Here again there may be different classes of tickets. Further, an event may span over different days or over different individual events. For example, a tennis tournament may span over several days and may include tickets to different matches, such as early matches, quarter and semi-finals, and finals. In this embodiment, the cache would again include different classes of tickets, different start dates, and different lengths of use.

Another example may be restaurant reservations. Here again, there are different classes of tables such as different seating capacities, smoking-nonsmoking, etc. There are also different dates of use. Restaurant reservations are a little different in that one table may be used over and over on a give date of use. Therefore, the cache of this embodiment may include for each restaurant, different use dates, and for each use date, different classes of tables. For each class of table, it may further include different reservation times of lengths of use in terms of minutes or hours. The lengths of use may be set to one value, such as a standard hour and a half for each use or it may vary based on time of day, such as an hour for lunch and two hours for dinner. Here again, a fall-off function may be used to update the cache, where the fall-off function dictates that reservations occurring closer in time are updated more often than those occurring later. Further, scoring may be used to increase inquiries for reservation times occurring around breakfast, lunch or dinner, as well as for seasonal events or weekend dates.

The systems, methods, and computer program products can also be used to reserve services, such as taxi service, maid service, etc. These services also have parameters related to date of use and length of use and would be handled in a similar manner to examples discussed above.

Described above are just a few examples of the application of the systems, methods, and computer program products of the present invention. It is understood that the present invention can be used with a wide range of products and services and is not limited to those described above. The above examples are merely provided herein to enhance a reader's understanding of the invention and should not in any way limit the present invention to these specific examples.

In addition to providing apparatus and methods, the present invention also provides computer program products for providing product availability information to a user from at least one product source. The computer program products have a computer readable storage medium having computer readable program code means embodied in the medium. With reference to FIG. 2B, the computer readable storage medium may be part of the storage device, and the processor of the present invention may implement the computer readable program code means to for providing product availability information to a user from at least one product source as described in the various embodiments above.

Discussed throughout are methods, diagrams, flowcharts and control flow illustrations of methods, systems and program products according to the invention. It will be understood that each block or step of the block diagram, flowchart and control flow illustrations, and combinations of blocks in the block diagram, flowchart and control flow illustrations, can be implemented by computer program instructions. These computer program instructions may be loaded onto a computer or other programmable apparatus to produce a machine, such that the instructions which execute on the computer or other programmable apparatus create means for implementing the functions specified in the block diagram, flowchart or control flow block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the block diagram, flowchart or control flow block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the block diagram, flowchart or control flow block(s) or step(s).

Accordingly, blocks or steps of the block diagram, flowchart or control flow illustrations support combinations of means for performing the specified functions, combinations of steps for performing the specified functions and program instruction means for performing the specified functions. It will also be understood that each block or step of the block diagram, flowchart or control flow illustrations, and combinations of blocks or steps in the block diagram, flowchart or control flow illustrations, can be implemented by special purpose hardware-based computer systems which perform the specified functions or steps, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for providing product availability information to a user from at least one product source, where a product has one or more associated different start dates indicating when a user may initiate use of the product, said method comprising:

accessing at least one product source and requesting product availability information concerning at least one product prior to receipt of a product availability request from a user concerning the product;

storing the product availability information received from the product source in a storage device;

receiving a product availability request from the user concerning a requested product;

accessing the product availability information stored in the storage device for the requested product;

determining the availability of the requested product based on at least the product availability information stored in the storage device;

generating an availability response based on at least the product availability information stored in the storage device; and updating the product availability information stored in the storage device more often for start dates of the requested product that occur sooner in time than for start dates that occur later in time, wherein the requested product can be used beginning on a particular start date and may be used for different lengths of use from the start date;

wherein said storing step comprises storing product availability information including start dates and a maximum length of use for each start date;

wherein said receiving step comprises receiving an availability request from the user concerning the requested product, a requested start date and a requested length of use;

wherein said determining step comprises determining the availability of the requested product for the requested start date and the requested length of use from the product availability information stored in the storage device; and wherein when the requested length of use for the requested product exceeds the maximum length of use stored in the storage device, said determining step comprises:

dividing the requested length of use into at least two selected lengths of use that are each less than the maximum length of use stored in the storage device, each selected length of use having an associated selected start date; and determining the availability of the requested product for each selected start date and selected length of use to determine the availability of the product for the requested start date and requested length of use.

2. A method according to claim 1, wherein said accessing step comprises accessing a plurality of product sources and requesting product availability information concerning at least one product, and said storing step comprises storing the product availability information for the at least one product from each product source in the storage device.

3. A method according to claim 1, wherein said updating step comprises updating the product availability information stored in the storage device by accessing the product sources, requesting product availability information about the product, and storing the product availability information in the storage device.

4. A method according to claim 1, wherein use of a product may begin on one of a plurality of different start dates and may be used for different lengths of time, wherein said updating step comprises using a decaying exponential function to determine which start dates to update the product availability information in the storage device for, such that start dates that occur sooner in time are updated more often than start dates that occur later in time.

5. A method according to claim 1, wherein use of a product may begin on one of a plurality of different start dates and may be used for different lengths of time, wherein said updating step comprises determining which start dates to update the product availability information for in the storage device by using the following function:

Start Date=$N^{(\log day/\log length)}$ where

Start Date=date to be queried

N=integer number (0, 1, 2, 3, . . . Day)

Day=maximum number of days out to be queried

Length=maximum number of days that can be returned in a query list.

6. A method according to claim 5, wherein said function generates a list of numbers, wherein said method further comprises adding each number in the list to said current date to determine the product availability for which start dates should be updated by said updating step in the storage device.

7. A method according to claim 1, wherein the product can be used beginning on a particular start date and may be used for different lengths of use, wherein for each length of use for each start date said accessing step comprises accessing product sources and requesting product availability information concerning the product for the particular start date of use and length of use, and said storing step comprises storing the product availability information in the storage device.

8. A method according to claim 7, wherein for each start date, said updating step comprises updating the product availability information for each length of use associated with the start date.

9. A method according to claim 3, wherein the storage device comprises product availability information from a plurality of product sources, wherein said method further comprises providing a score for each product source based at least on a popularity of the product source, and said updating step comprises updating the product availability information stored in the storage device for each product source based on the score associated with each product source.

10. A method according to claim 9, wherein said updating step comprises updating product availability information for product sources having higher scores more than product sources having lower scores.

11. A method according to claim 9, wherein said updating step comprises performing a selected number of updates of product source information for a given update session, and said updating step comprises assigning more updates to product sources having higher scores than to product sources having lower scores.

12. A method according to claim 11, wherein a minimum number of updates are performed on each product source independent of the product source's associated score.

13. A method according to claim 1, wherein said dividing step comprises dividing the requested length of use into at least two selected lengths of use, wherein each selected length of use includes at least two days.

14. A method according to claim 1, wherein said dividing step comprises creating at least two scenarios, wherein each scenario includes a set of selected start dates and lengths of use that are each less than the maximum length of use, and wherein at least one of the start dates of one scenario is different from the start date of the other scenario.

15. A method according to claim 1, wherein said dividing step comprises creating at least two scenarios, wherein each scenario includes a set of selected start dates and lengths of use that are each less than the maximum length of use, and said dividing step comprises using the following function to create the scenarios:

1) If LOS modulo x=0
where
LOS=length of use of request
x=maximum length of use stored in the cache
Then Scenario 1: $A, B, C$ $A = x/2$ $B = \sum_{1}^{int(LOS-(x/2))/x} x$ $C = LOS - (A + B)$ Scenario 2:

-continued $= \sum_{1}^{int(LOS/x)} x$

2) If LOS modulo x>0
Then

Scenario 1: $A, B, C$ $A = (x - 1)$ $B = \sum_{1}^{int(LOS-A)/x} x$ $C = LOS - (A + B)$ Scenario 2: $C, B, A$.

16. A system for providing product availability information to a user from at least one product source, where a product has one or more associated different start dates indicating when a user may initiate use of the product, said system comprising:

an interface connected to at least one product source;
a processing element connected to said interface for communicating with the product source; and
a storage device in electrical communication with said processing element, wherein said processing element comprises:
means for accessing at least one product source and requesting product availability information concerning at least one product prior to receipt of a product availability request from a user concerning the product;
means for storing the product availability information received from the product source in said storage device;
means for receiving a product availability request from the user concerning a requested product, a requested start date and a requested length of use;
means for accessing the product availability information stored in the storage device for the selected product;
means for determining the availability of the requested product based on at least the product availability information stored in the storage device;
means for generating an availability response based on at least the product availability information stored in the storage device; and
means for updating the product availability information stored in the storage device more often for start dates of the requested product that occur sooner in time than for start dates that occur later in time,
wherein the requested product can be used beginning on a particular start date and may be used for different lengths of use from the start date,
wherein said means for storing stores product availability information including start dates and a maximum length of use for each start date, and
wherein when the requested length of use for the requested product exceeds the maximum length of use stored in the storage device, said means for determining:
divides the requested length of use into at least two selected lengths of use that are each less than the maximum length of use stored in said storage device, each selected length of use having an associated selected start date; and determines the availability of the requested product for each selected start date and selected length of use to thereby determine the availability of the product for the requested start date and requested length of use.

17. A system according to claim 16, wherein said updating means updates the product availability information stored in the storage device by accessing the product sources, requesting product availability information about the product, and storing the product availability information in the storage device.

18. A system according to claim 17, wherein use of a product may begin on one of a plurality of different start dates and may be used for different lengths of time, wherein said processing element uses a decaying exponential function to determine which start dates to update the product availability information in the storage device for, such that start dates that occur sooner in time are updated more often than start dates that occur later in time.

19. A system according to claim 17, wherein use of a product may begin on one of a plurality of different start dates and may be used for different lengths of time, wherein said processing element determines which start dates to update the product availability information for in the storage device by using the following function:

Start Date=$N^{(log\ day/log\ length)}$ where

Start Date=date to be queried

N=integer number (0, 1, 2, 3, . . . Day)

Day=maximum number of days out to be queried

Length=maximum number of days that can be returned in a query list.

20. A system according to claim 17, wherein said storage device comprises product availability information from a plurality of product sources, wherein said processing element provides a score for each product source based at least on a popularity of the product source and updates the product availability information stored in said storage device for each product source based on the score associated with each product source.

21. A system according to claim 16, wherein said processing element divides the requested length of use into at least two selected lengths of use, wherein each selected length of use is at least two days.

22. A system according to claim 16, wherein said processing element creates at least two scenarios, wherein each scenarios includes a set of selected start dates and lengths of use that are each less than the maximum length of use, and wherein at least one of the start dates of one scenario is different from the start date of the other scenario.

23. A system according to claim 16, wherein said processing element creates at least two scenarios, wherein each scenario includes a set of selected start dates and lengths of use that are each less than the maximum length of use, said processing element uses the following function to create the scenarios:

1) If LOS modulo x=0 where

LOS=length of use of request x=maximum length of use stored in the cache

Then

Scenario 1: A, B, C $A = x/2$ $B = \sum_{1}^{int(LOS-(x/2))/x} x$ $C = LOS - (A + B)$ Scenario 2:

$= \sum_{1}^{int(LOS/x)} x$

2) If LOS modulo x>0

Then

Scenario 1: A, B, C $A = (x - 1)$ $B = \sum_{1}^{int(LOS-A)/x} x$ $C = LOS - (A + B)$ Scenario 2: C, B, A.

24. A computer program product for providing product availability information to a user from at least one product source, where a product has one or more associated different start dates indicating when a user may initiate use of the product, wherein the computer program product comprises:

a computer readable storage medium having computer readable program code means embodied in said medium, said computer-readable program code means comprising:

first computer-readable program code means for accessing at least one product source and requesting product availability information concerning at least one product prior to receipt of a product availability request from a user concerning the product;

second computer-readable program code means for storing the product availability information received from the product source in a storage device;

third computer-readable program code means for receiving a product availability request from the user concerning a requested product, a requested start date and a requested length of use;

fourth computer-readable program code means for accessing the product availability information stored in the storage device for the requested product;

fifth computer-readable program code means for determining the availability of the requested product based on at least the product availability information stored in the storage device;

sixth computer-readable program code means for updating product availability information stored in the storage device more often for start dates of the requested product that occur sooner in time than for start dates that occur later in time; and seventh computer-readable program code means for generating an availability response based on at least the product availability information stored in the storage device,
wherein the requested product can be used beginning on a particular start date and may be used for different lengths of use from the start date,
wherein said second computer-readable program code means stores product availability information including start dates and a maximum length of use for each start date, and
wherein when the requested length of use for the requested product exceeds the maximum length of use stored in the storage device, said fifth computer-readable program code means:
divides the requested length of use into at least two selected lengths of use that are each less than the maximum length of use stored in the storage device, each selected length of use having an associated selected start date; and
determines the availability of the requested product for each selected start date and selected length of use to thereby determine the availability of the product for the requested start date and requested length of use.

25. A computer program product according to claim 24, wherein said sixth computer-readable program code means updates the product availability information stored in the storage device by accessing the product sources, requesting product availability information about the product, and storing the product availability information in the storage device.

26. A computer program product according to claim 24, wherein use of a product may begin on one of a plurality of different start dates and may be used for different lengths of time, wherein said sixth computer-readable program code means determines which start dates to update the product availability information for in the storage device by using the following function:
Start Date=$N^{(log\ day/log\ length)}$
where
Start Date=date to be queried
N=integer number (0, 1, 2, 3, . . . Day)
Day=maximum number of days out to be queried
Length=maximum number of days that can be returned in a query list.

27. A computer program product according to claim 25, wherein the storage device comprises product availability information from a plurality of product sources, wherein said computer readable medium further comprises seventh computer-readable code means for providing a score for each product source based at least on a popularity of the product source, and said sixth computer-readable codes means updates the product availability information stored in the storage device for each product source based on the score associated with each product source.

28. A computer program product according to claim 24, wherein said fifth computer-readable program code means divides the requested length of use into at least two selected lengths of use, wherein each selected length of use includes at least two days.

29. A computer program product according to claim 24, wherein said fifth computer-readable program code means creates at least two scenarios, wherein each scenarios includes a set of selected start dates and lengths of use that are each less than the maximum length of use, and wherein at least one of the start dates of one scenario is different from the start date of the other scenario.

30. A computer program product according to claim 24, wherein said fifth computer-readable program code means creates at least two scenarios, wherein each scenario includes a set of selected start dates and lengths of use that are each less than the maximum length of use, said fifth computer-readable program code means uses the following function to create the scenarios:
1) If LOS modulo x=0
where
LOS=length of use of request
x=maximum length of use stored in the cache
Then Scenario 1: $A, B, C$ $A = x/2$ $B = \sum_{1}^{int(LOS-(x/2))/x} x$ $C = LOS - (A + B)$ Scenario 2:

$= \sum_{1}^{int(LOS/x)} x$

2) If LOS modulo x>0
Then

Scenario 1: $A, B, C$ $A = (x - 1)$ $B = \sum_{1}^{int(LOS-A)/x} x$ $C = LOS - (A + B)$ Scenario 2: $C, B, A$.

31. A method for providing product availability information to a user from at least one product source, where a product has one or more associated different start dates indicating when a user may initiate use of the product, said method comprising:
accessing at least one product source and requesting product availability information concerning at least one product for different start dates prior to receipt of a product availability request from a user concerning the product;
storing the product availability information received from the product source in a storage device;
determining the availability of a requested product for a requested start date and a requested length of use selected by the user based on at least the product availability information stored in the storage device;
generating an availability response based on at least the product availability information stored in the storage device; and
updating product availability information stored in the storage device more often for start dates of the selected product that occur sooner in time than for start dates that occur later in time, wherein said storing step comprises storing product availability information including start dates and a maximum length of use for each start date, wherein when the requested length of use for the requested product exceeds the maximum length of use stored in the storage device, said determining step comprises:

dividing the requested length of use into at least two selected lengths of use that are each less than the maximum length of use stored in the storage device, each selected length of use having an associated selected start date; and determining the availability of the requested product for the requested start date and requested length of use by determining the availability of the requested product for each selected length of use and associated selected start date.

32. A method according to claim 31, wherein said updating step comprises using a decaying exponential function to determine which start dates to update the product availability information in the storage device for, such that start dates that occur sooner in time are updated more often than start dates that occur later in time.

33. A method according to claim 31, wherein said updating step comprises determining which start dates to update the product availability information for in the storage device by using the following function:

Start Date=$N^{(\log day/\log length)}$ where

Start Date=date to be queried

N=integer number (0, 1, 2, 3, . . . Day)

Day=maximum number of days out to be queried

Length=maximum number of days that can be returned in a query list.

34. A method according to claim 33, wherein said function generates a list of numbers, wherein said method further comprises adding each number in the list to said current date to determine the product availability for which start dates should be updated by said updating step in the storage device.

35. A method according to claim 31, wherein the product can be used beginning on a particular start date and may be used for different lengths of use, wherein for each length of use for each start date said accessing step comprises accessing product sources and requesting product availability information concerning the product for the particular start date of use and length of use, and said storing step comprises storing the product availability information in the storage device.

36. A method according to claim 35, further comprising updating product availability information in the storage device more often for start dates that occur sooner in time than for start dates that occur later in time, wherein for each start date, said updating step comprises updating the product availability information for each length of use associated with the start date.

37. A system for providing product availability information to a user from at least one product source, where a product has one or more associated different start dates indicating when a user may initiate use of the product, said system comprising:

an interface connected to at least one product source;

a processing element connected to said interface for communicating with the product source; and a storage device in electrical communication with said processing element, wherein said processing element comprises:

means for accessing at least one product source and requesting product availability information concerning at least one product for different start dates prior to receipt of a product availability request from a user concerning the product;

means for storing the product availability information received from the product source in said storage device;

means for determining the availability of a requested product for a requested start date and a requested length of use selected by the user based on at least the product availability information stored in said storage device;

means for generating an availability response based on at least the product availability information stored in the storage device; and means for updating product availability information stored in the storage device more often for start dates of the requested product that occur sooner in time than for start dates that occur later in time, wherein said means for storing stores product availability information including start dates and a maximum length of use for each start date, wherein when the requested length of use for the requested product exceeds the maximum length of use stored in the storage device, said means for determining:

divides the requested length of use into at least two selected lengths of use that are each less than the maximum length of use stored in said storage device, each selected length of use having an associated selected start date; and determines the availability of the requested product for the requested start date and requested length of use by determining the availability of the requested product for each selected length of use and associated selected start date.

38. A system according to claim 37, wherein said processing element uses a decaying exponential function to determine which start dates to update the product availability information in the storage device for, such that start dates that occur sooner in time are updated more often than start dates that occur later in time.

39. A system according to claim 37, wherein said processing element determines which start dates to update the product availability information for in the storage device by using the following function:

Start Date=$N^{(\log day/\log length)}$ where

Start Date=date to be queried

Day=maximum number of days out to be queried

Length=maximum number of days that can be returned in a query list.

40. A computer program product for providing product availability information to a user from at least one product source, where a product has one or more associated different start dates indicating when a user may initiate use of the product, wherein the computer program product comprises:

a computer readable storage medium having computer readable program code means embodied in said medium, said computer-readable program code means comprising:

first computer-readable program code means for accessing at least one product source and requesting product availability information concerning at least one product for different start dates prior to receipt of a product availability request from a user concerning the product;

second computer-readable program code means for storing the product availability information received from the product source in a storage device;

third computer-readable program code means for determining the availability of a requested product for a requested start date and a requested length of use selected by the user based on at least the product availability information stored in the storage device;

fourth computer-readable program code means for updating product availability information stored in the storage device more often for start dates of the selected product that occur sooner in time than for start dates that occur later in time; and fifth computer readable program code means for generating an availability response based on at least the product availability information stored in the storage device, wherein the requested product can be used beginning on a particular start date and may be used for different lengths of use from the start date, wherein said second computer-readable program code means stores product availability information including start dates and a maximum length of use for each start date, and wherein when the requested length of use for the requested product exceeds the maximum length of use stored in the storage device, said third computer-readable program code means:

divides the requested length of use into at least two selected lengths of use that are each less than the maximum length of use stored in the storage device, each selected length of use having an associated selected start date; and determines the availability of the requested product for the requested start date and requested length of use by determining the availability of the requested product for each selected length of use and associated selected start date.

41. A computer program product according to claim 40, wherein said fourth computer-readable program code means uses a decaying exponential function to determine which start dates to update the product availability information in the storage device for such that start dates that occur sooner in time are updated more often than start dates that occur later in time.

42. A computer program product according to claim 40, wherein said fourth computer-readable program code means determines which start dates to update the product availability information for in the storage device by using the following function:

Start Date=$N^{(log\ day/log\ length)}$ where

Start Date=date to be queried

N=integer number (0, 1, 2, 3, . . . Day)

Day=maximum number of days out to be queried

Length=maximum number of days that can be returned in a query list.

43. A method for providing product availability information to a user from at least one product source, where a product has one or more associated availability start dates indicating when a user may initiate use of the product and has one or more available lengths of use associated with each start date, said method comprising:

accessing at least one product source and requesting product availability information concerning at least one product prior to receipt of a product availability request from a user concerning the product;

storing the product availability information received from the product source in a storage device;

receiving a product availability request from the user concerning a requested product, a requested start date, and a requested length of use;

accessing the product availability information stored in the storage device for the requested product;

determining the availability of the requested product based on at least the product availability information stored in the storage device; and generating an availability response based on at least the product availability information stored in the storage device;

wherein said storing step comprises storing product availability information including start dates and a maximum length of use for each start date, wherein when the requested length of use for the requested product exceeds the maximum length of use stored in the storage device, said determining step comprises:

dividing the requested length of use into at least two selected lengths of use that are each less than the maximum length of use stored in the storage device, each selected length of use having an associated start date; and determining the availability of the requested product for each selected length of use and associated start date to thereby determine the availability of the requested product for the requested start date and requested length of use.

44. A method according to claim 43, wherein said dividing step comprises dividing the requested length of use into at least two selected lengths of use, wherein each selected length of use includes at least two days.

45. A method according to claim 43, wherein said dividing step comprises creating at least two scenarios, wherein each scenario includes a set of selected start dates and lengths of use that are each less than the maximum length of use and wherein at least one of the start dates of one scenario is different from the start date of the other scenario.

46. A method according to claim 43, wherein said dividing step comprises creating at least two scenarios, wherein each scenario includes a set of selected start dates and lengths of use that are each less than the maximum length of use, and said dividing step comprises using the following function to create the scenarios:

1) If LOS modulo x=0 where

LOS=length of use of request x=maximum length of use stored in the cache

Then

Scenario 1: $A, B, C$ $A = x/2$ $B = \sum_{1}^{int(LOS-(x/2))/x} x$ $C = LOS - (A + B)$ Scenario 2:

$= \sum_{1}^{int(LOS/x)} x$

2) If LOS modulo x>0
Then

Scenario 1: $A, B, C$ $$A = (x - 1)$$

$$B = \sum_{1}^{int(LOS-A)/x} x$$

$$C = LOS - (A + B)$$

Scenario 2: $C, B, A$.

47. A method according to claim 43, wherein for each start date there are a maximum length of use and different shorter lengths of use, wherein said storing step may determine which of the shorter lengths of use can be determined by using the maximum length of use and thereby only stores in the storage device product availability information for the maximum length of use and the shorter lengths of use that are not derivable from the maximum length of use.

48. A method according to claim 47, wherein if a price associated with a first shorter length of use is substantially equal to a price associated with the maximum length of use, then said storing step determines that the first shorter length of use can be determined using the maximum length of use.

49. A system for providing product availability information to a user from at least one product source, where a product has one or more associated different start dates indicating when a user may initiate use of the product and where the product may be used for different lengths of use, said system comprising:

an interface connected to at least one product source;
a processing element connected to said interface for communicating with the product source; and
a storage device in electrical communication with said processing element, wherein said processing element comprises:
means for accessing at least one product source and requesting product availability information concerning at least one product prior to receipt of a product availability request from a user concerning the product;
means for storing the product availability information received from the product source in the storage device;
means for receiving a product availability request from the user concerning a requested product, a requested start date, and a requested length of use;
means for accessing the product availability information stored in the storage device for the requested product;
means for determining the availability of the requested product based on at least the product availability information stored in the storage device; and
means for generating an availability response based on at least the product availability information stored in the storage device;
wherein said means for storing stores product availability information for a maximum length of use for each start date,
wherein when the requested length of use for the requested product exceeds the maximum length of use stored in the storage device, said means for determining determines the availability by:
dividing the requested length of use into at least two selected lengths of use that are each less than the maximum length of use stored in the storage device, each selected length of use having an associated start date; and
determining the availability of the requested product for each selected length of use and associated start date to thereby determine the availability of the requested product for the requested start date and requested length of use.

50. A system according to claim 49, wherein said processing element divides the requested length of use into at least two selected lengths of use, wherein each selected length of use includes at least two days.

51. A system according to claim 49, wherein said processing element creates at least two scenarios, wherein each scenarios includes a set of selected start dates and lengths of use that are each less than the maximum length of use, and wherein at least one of the start dates of one scenario is different from the start date of the other scenario.

52. A system according to claim 49, wherein said processing element creates at least two scenarios, wherein each scenario includes a set of selected start dates and lengths of use that are each less than the maximum length of use, said processing element using the following function to create the scenarios:

1) If LOS modulo x=0
where
LOS=length of use of request
x=maximum length of use stored in the cache
Then Scenario 1: $A, B, C$ $$A = x/2$$

$$B = \sum_{1}^{int(LOS-(x/2))/x} x$$

$$C = LOS - (A + B)$$

Scenario 2:

$$= \sum_{1}^{int(LOS/x)} x$$

2) If LOS modulo x>0
Then

Scenario 1: $A, B, C$ $$A = (x - 1)$$

$$B = \sum_{1}^{int(LOS-A)/x} x$$

$$C = LOS - (A + B)$$

Scenario 2: $C, B, A$.

53. A system according to claim 49, wherein for each start date there are a maximum length of use and different shorter lengths of use, wherein said processing element determines which of the shorter lengths of use can be determined by using the maximum length of use and thereby only stores in the storage device product availability information for the maximum length of use and the shorter lengths of use that are not derivable from the maximum length of use.

54. A system according to claim 53, wherein if a price associated with a first shorter length of use is substantially equal to a price associated with the maximum length of use, then said processing element determines that the first shorter length of use can be determined using the maximum length of use.

55. A computer program product for providing product availability information to a user from at least one product source, where a product has one or more associated different start dates indicating when a user may initiate use of the product and where the product may be used for different lengths of time, wherein the computer program product comprises:
a computer readable storage medium having computer readable program code means embodied in said medium, said computer-readable program code means comprising:
first computer-readable program code means for accessing at least one product source and requesting product availability information concerning at least one product prior to receipt of a product availability request from a user concerning the product;
second computer-readable program code means for storing the product availability information received from the product source in a storage device;
third computer-readable program code means for receiving a product availability request from the user concerning a requested product, a requested start date, and a requested length of use;
fourth computer-readable program code means for accessing the product availability information stored in the storage device for the requested product; and
fifth computer-readable program code means for determining the availability of the requested product based on at least the product availability information stored in the storage device; and
sixth computer-readable program code means for generating an availability response based on at least the product availability information stored in the storage device,
wherein said second computer-readable program code means stores product availability information for a maximum length of use for each start date,
wherein when the requested length of use for the requested product exceeds the maximum length of use stored in the storage device, said fifth computer-readable code means:
divides the requested length of use into at least two selected lengths of use that are each less than the maximum length of use stored in the storage device, each selected length of use having an associated start date; and
determines the availability of the requested product for each selected length of use and associated start date to thereby determine the availability of the requested product for the requested start date and requested length of use.

56. A computer program product according to claim 55, wherein when the requested length of use for the requested product exceeds the maximum length of use stored in the storage device, said fifth computer-readable program code means divides the requested length of use into at least two selected lengths of use, wherein each selected length of use includes at least two days.

57. A computer program product according to claim 56, wherein said fifth computer-readable program code means creates at least two scenarios, wherein each scenario includes a set of selected start dates and lengths of use that are each less than the maximum length of use, and wherein at least one of the start dates of one scenario is different from the start date of the other scenario.

58. A computer program product according to claim 55, wherein said fifth computer-readable program code means creates at least two scenarios, wherein each scenario includes a set of selected start dates and lengths of use that are each less than the maximum length of use, said dividing step using the following function to create the scenarios:

1) If LOS modulo x=0
where
LOS=length of use of request
x=maximum length of use stored in the cache
Then Scenario 1: $A, B, C$ $$A = x/2$$

$$B = \sum_{1}^{int(LOS-(x/2))/x} x$$

$$C = LOS - (A + B)$$

Scenario 2:

$$= \sum_{1}^{int(LOS/x)} x$$

2) If LOS modulo x>0
Then

Scenario 1: $A, B, C$ $$A = (x - 1)$$

$$B = \sum_{1}^{int(LOS-A)/x} x$$

$$C = LOS - (A + B)$$

Scenario 2: $C, B, A$.

59. A method for providing product availability information to a user from at least two product sources, said method comprising:
accessing the at least two product sources and requesting product availability information concerning at least one product prior to receipt of a product availability request from a user concerning the product;
storing the product availability information received from the product sources in a storage device;
determining the availability of a requested product for a requested start date and a requested length of use requested by the user based on at least the product availability information stored in the storage device;
providing the user with product availability information concerning the requested product from each product source;
accumulating the number of times that a product source's product relates to an availability request and the number of times that the product source had availability for the requested product;
dividing the number of times that the product source had availability for the requested product by the number of times that a product source's product related to an availability request to thereby determine a hit ratio;

comparing the hit ratio to a hit ratio threshold; and updating the product availability information stored in the storage device for product sources, wherein said updating step increases the number of times product availability information is updated for a product source having a hit ratio that is less than or equal to the hit ratio threshold, wherein said storing step comprises storing product availability information including start dates and a maximum length of use for each start date, wherein when the requested length of use for the requested product exceeds the maximum length of use stored in the storage device, said determining step comprises:

dividing the requested length of use into at least two selected lengths of use that are each less than the maximum length of use stored in the storage device, each selected length of use having an associated selected start date; and determining the availability of the requested product for the requested start date and requested length of use by determining the availability of the requested product for each selected length of use and associated selected start date.

60. A method according to claim 59, wherein said updating step decreases the number of times product availability information is updated for a product source having a hit ratio that is at least as great as the hit ratio threshold.

61. A system for providing product availability information to a user from at least two product sources, said system comprising:

an interface connected to at least one product source;

a processing element connected to said interface for communicating with the product source; and a storage device in electrical communication with said processing element, wherein said processing element comprises:

means for accessing the at least two product sources and requesting product availability information concerning at least one product prior to receipt of a product availability request from a user concerning the product;

means for storing the product availability information received from the product sources in a storage device;

means for determining the availability of a requested product for a requested start date and a requested length of use by the user based on at least the product availability information stored in the storage device;

means for providing the user with product availability information concerning the requested product from each product source;

means for accumulating the number of times that a product source's product relates to an availability request and the number of times that the product source had availability for the requested product;

means for dividing the number of times that the product source had availability for the requested product by the number of times that a product source's product related to an availability request to thereby determine a hit ratio;

means for comparing the hit ratio to a hit ratio threshold; and means for updating the product availability information stored in the storage device for product sources, wherein said updating means comprises means for increasing the number of times product availability information is updated for a product source having a hit ratio that is less than or equal to the hit ratio threshold, wherein said means for storing stores product availability information including start dates and a maximum length of use for each start date, wherein when the requested length of use for the requested product exceeds the maximum length of use stored in the storage device, said means for determining:

divides the requested length of use into at least two selected lengths of use that are each less than the maximum length of use stored in said storage device, each selected length of use having an associated selected start date; and determines the availability of the requested product for the requested start date and requested length of use by determining the availability of the requested product for each selected length of use and associated selected start date.

62. A system according to claim 61, wherein said updating means comprises means for decreasing the number of times product availability information is updated for a product source having a hit ratio that is at least as great as the hit ratio threshold.

63. A method for providing product availability information to a user from at least one product source, where a product has one or more associated different start dates indicating when a user may initiate use of the product, said method comprising:

accessing at least one product source and requesting product availability information concerning at least one product prior to receipt of a product availability request from a user concerning the product;

storing the product availability information received from the product source in a storage device;

receiving a product availability request from a user concerning a requested product, a requested start date, and a requested length of use;

accessing the product availability information stored in the storage device for the selected product;

determining the availability of the requested product based on at least the product availability information stored in the storage device;

generating an availability response based on at least the product availability information stored in the storage device; and updating the product availability information stored in the storage device according to seasonal information, wherein the seasonal information comprises a range of dates, wherein updating the product availability information stored in the storage device comprises updating more often for start dates within the date range defined by the seasonal information than for start dates not within the date range defined by the seasonal information, wherein said storing step comprises storing product availability information including start dates and a maximum length of use for each start date, wherein when the requested length of use for the requested product exceeds the maximum length of use stored in the storage device, said determining step comprises:

dividing the requested length of use into at least two selected lengths of use that are each less than the maximum length of use stored in the storage device, each selected length of use having an associated selected start date; and determining the availability of the requested product for the requested start date and requested length of use by determining the availability of the requested product for each selected length of use and associated selected start date.

64. A method according to claim 63, wherein the seasonal information comprises the dates of a holiday season, and wherein updating the product availability information stored in the storage device comprises updating more often for start dates within the holiday season than for start dates not within the holiday season.

* * * * *